United States Patent [19]
Kasten

[11] Patent Number: 5,193,281
[45] Date of Patent: Mar. 16, 1993

[54] APPARATUS FOR CHANGING THE CUTTING DIRECTION IN A RECIPROCATING SAW

[76] Inventor: Vincent A. Kasten, 295 Midway Ave., Fanwood, N.J. 07023

[21] Appl. No.: 845,278

[22] Filed: Mar. 3, 1992

[51] Int. Cl.⁵ .......................................... B27B 19/00
[52] U.S. Cl. ...................................... 30/394; 74/110; 30/392
[58] Field of Search .................. 30/392, 394, 122; 74/110

[56] References Cited

U.S. PATENT DOCUMENTS

| | | | |
|---|---|---|---|
| 1,855,371 | 4/1932 | Ungar | 30/394 |
| 2,949,944 | 8/1960 | Blachly | 30/394 |
| 3,220,267 | 11/1965 | Smith | 74/110 |
| 4,751,970 | 6/1988 | Hecker et al. | 74/110 |
| 4,824,087 | 4/1989 | Hannel | 74/110 |

FOREIGN PATENT DOCUMENTS

| | | | |
|---|---|---|---|
| 1279923 | 10/1968 | Fed. Rep. of Germany | 30/394 |
| 3408847 | 11/1985 | Fed. Rep. of Germany | 30/392 |

Primary Examiner—Frank T. Yost
Assistant Examiner—Hwei-Siu Payer
Attorney, Agent, or Firm—Lerner, David, Littenberg, Krumholz & Mentlik

[57] ABSTRACT

An apparatus for connection to a reciprocating saw changes the direction in which cutting takes place from the reciprocating direction of the saw to a different direction. A first push rod is connected to the saw bar for linear movement in the reciprocating direction of the saw. A second push rod having a saw blade connected thereto is arranged for linear movement in a direction different than the reciprocating direction of the saw. A transmission disposed between the push rods transmits the reciprocating movement of the first push rod to a corresponding reciprocating movement of the second push rod, thereby imparting a cutting motion to the saw blade. The reciprocating direction of the second push rod with respect to the first push rod can be either fixed or adjustable. Optionally, the apparatus can be pivotably connected to the saw so that the angular disposition of these elements with respect to one another can be adjusted as desired.

27 Claims, 7 Drawing Sheets

APPARATUS FOR CHANGING THE CUTTING DIRECTION IN A RECIPROCATING SAW

FIELD OF THE INVENTION

The present invention relates to attachments for reciprocating saws and, more particularly, to an apparatus which can be attached to a conventional reciprocating saw in order to change the direction in which the saw cuts.

BACKGROUND OF THE INVENTION

Reciprocating saws have come to enjoy considerable popularity, particularly among carpenters, plumbers, electricians and other tradesmen. These saws generally employ long, relatively narrow blades which are easily positioned for cutting and which enable the saw to be maneuvered during the cutting process so that nonlinear cuts can be made. In use, one end of a saw blade will typically be secured to a reciprocating saw bar so that cutting can take place in the reciprocating direction. In most situations, this is perfectly acceptable. That is, in most situations, the object to be cut is accessible and easily reached by the saw blade. However, situations frequently arise in which the object to be cut is in a confined space which cannot easily be reached. Frequently, the size and shape of the saw itself prevents the saw blade from being properly positioned in order to make a desired cut.

There therefore exists a need for a reciprocating saw which is capable of cutting objects which are not readily accessible. In particular, the need exists for an apparatus which can readily be attached to the saw bar of existing reciprocating saws so that such saws are capable of cutting in directions other than the reciprocating direction of the saw bar.

SUMMARY OF THE INVENTION

In accordance with one aspect of the present invention, these needs have now been addressed by the invention of an apparatus which may be removeably connected to a reciprocating saw for changing the cutting direction from the reciprocating direction of the saw to a different direction. The apparatus includes a housing, joining means for removeably joining the housing to a reciprocating saw, a first push rod disposed in the housing for reciprocating movement in first linear directions, first connecting means for connecting the first push rod to the saw bar of the saw, a second push rod disposed in the housing for reciprocating movement in second linear directions oriented at an angle to the first linear directions, second connecting means for connecting a saw blade to the second push rod, and transmission means disposed between the first and second push rods for transmitting the reciprocating movement of the first push rod to a corresponding reciprocating movement of the second push rod.

In accordance with one embodiment, the angle between the first and second linear directions is fixed, preferably at 90°. In preferred embodiments, the angle between the first and second linear directions can be adjusted.

In another embodiment, the transmission means includes an intermediate member pivotably disposed in the housing, the first and second push rods being operatively connected to the intermediate member, whereby reciprocation of the first push rod in the first linear directions reciprocally pivots the intermediate member and causes the second push rod to reciprocate in the second linear directions. In highly preferred embodiments, the transmission means further includes an adjustable member pivotably disposed in the housing, the first push rod being connected to the intermediate member and the second push rod being connected to the adjustable member, the adjustable member being connectable at select positions to the intermediate member, each one of the select positions providing a different angle between the first and second linear directions. The apparatus in accordance with this preferred embodiment thus enables the angle between the first and second linear directions to be adjusted as desired.

In yet another embodiment, a circumferential portion of the intermediate member includes a first plurality of teeth and the first and second push rods each include a second plurality of teeth, the second plurality of teeth adapted to matingly engage the first plurality of teeth.

In a still further embodiment of the present invention, the transmission means includes a guide channel formed in the housing and a connecting member guided for reciprocating movement in the guide channel and having first and second ends, the first end being connected to the first push rod and the second end being connected to the second push rod.

In yet a further embodiment of the present invention, the joining means includes clamp means for clamping the housing to a guide shoe on the saw. In preferred embodiments, the clamp means includes means for pivotably clamping the housing to the guide shoe on the saw and the first connecting means includes means for pivotably connecting the first push rod to the saw bar.

Another aspect of the present invention provides a reciprocating saw assembly consisting of a saw having a housing, a saw bar and means for reciprocating the saw bar in first linear directions with respect to the housing. Joining means removeably join an attachment housing to the saw. A first push rod disposed in the attachment housing is connected to the saw bar for reciprocating movement in the first linear directions, and a second push rod disposed in the attachment housing is adapted for reciprocating movement in second linear directions which are oriented at an angle to the first linear directions. Connecting means are provided for connecting a saw blade to the second push rod, and transmission means are disposed between the first and second push rods for transmitting the reciprocating movement of the first push rod to a corresponding reciprocating movement of the second push rod.

In one embodiment of the saw assembly, the angle between the first and second linear directions is fixed, preferably at an angle of 90°. In preferred embodiments, the angle between the first and second linear directions is adjustable.

In another embodiment of the saw assembly, the transmission means includes an intermediate member pivotably disposed in the attachment housing, the first and second push rods being operatively connected to the intermediate member, whereby reciprocation of the first push rod in the first liner directions reciprocally pivots the intermediate member and causes the second push rod to reciprocate in the second linear directions. In highly preferred embodiments, the transmission means further includes an adjustable member pivotably disposed in the attachment housing, the first push rod being connected to the intermediate member and the second push rod being connected to the adjustable member, the adjustable member being connectable at select positions to the intermediate member, each one of the select positions providing a different angle between the first and second linear directions. In accordance with this preferred embodiment of the saw assembly, the angle between the first and second directions can be adjusted.

In yet another embodiment of the saw assembly, a circumferential portion of the intermediate member includes a first plurality of teeth and the first and second push rods each include a second plurality of teeth, the second plurality of teeth adapted to matingly engage the first plurality of teeth.

In still another embodiment of the saw assembly, the transmission means includes a guide channel formed in the attachment housing and a connecting member guided for reciprocating movement in the guide channel and having first and second ends, the first end being connected to the first push rod and the second end being connected to the second push rod.

In a still further embodiment of the saw assembly, the saw includes a guide shoe and the joining means includes clamp means for clamping the attachment housing to the guide shoe. In more preferred embodiments, the clamp means includes means for pivotably clamping the attachment housing to the guide shoe and the first push rod is connected for pivotable movement with respect to the saw bar.

Yet another aspect of the present invention provides a reciprocating saw consisting of a saw housing, a saw bar and means for reciprocating the saw bar in first linear directions with respect to the saw housing. A saw carrier is disposed for reciprocating movement in second linear directions oriented at an angle to the first linear directions. Connecting means are provided for connecting a saw blade to the saw carrier. The saw further includes means for transmitting the reciprocating movement of the saw bar to a corresponding reciprocating movement of the saw carrier.

BRIEF DESCRIPTION OF THE DRAWINGS

A more complete appreciation of the subject matter of the present invention and the various advantages thereof can be realized by reference to the following detailed description, in which reference is made to the accompanying drawings in which.

DETAILED DESCRIPTION OF THE PREFERRED EMBODIMENTS

Figures 1, 1A:
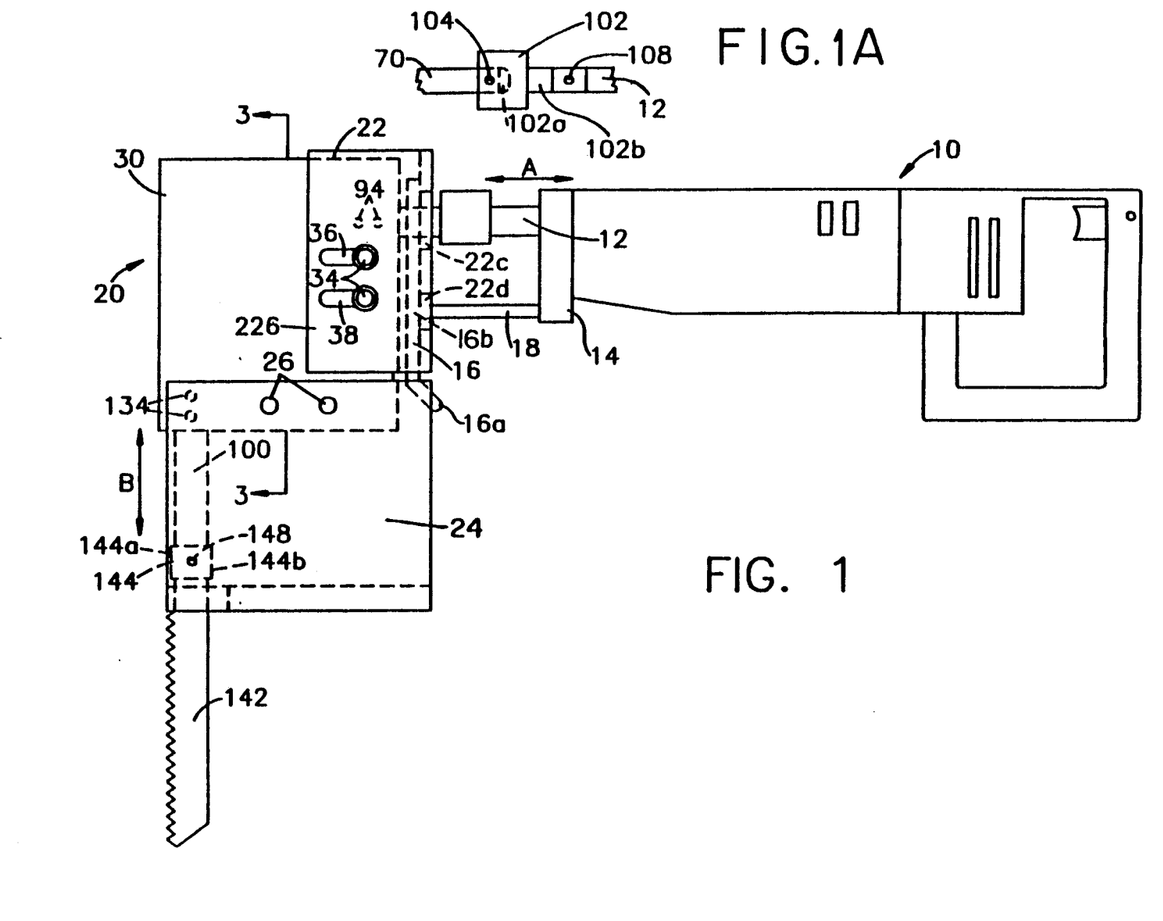
FIG. 1 is a side elevational view showing a highly schematic view of a reciprocating saw having the apparatus of the present invention connected thereto.
FIG. 1A is an enlarged detailed view showing the connection of a push rod to the saw bar of a reciprocating saw.

Referring to FIG. 1, there is illustrated a reciprocating saw 10 to which is assembled an apparatus 20 constructed in accordance with the present invention. As used herein, the term "reciprocating saw" refers to power-operated saws having means for repeatedly reciprocating a saw bar back and forth. Typically, a cutting blade is connected for reciprocation with the saw bar so that a cutting action is produced upon operation of the saw. Reciprocating saws of this type include jigsaws, sabre saws, SAWZALLS and the like.

Figure 2:
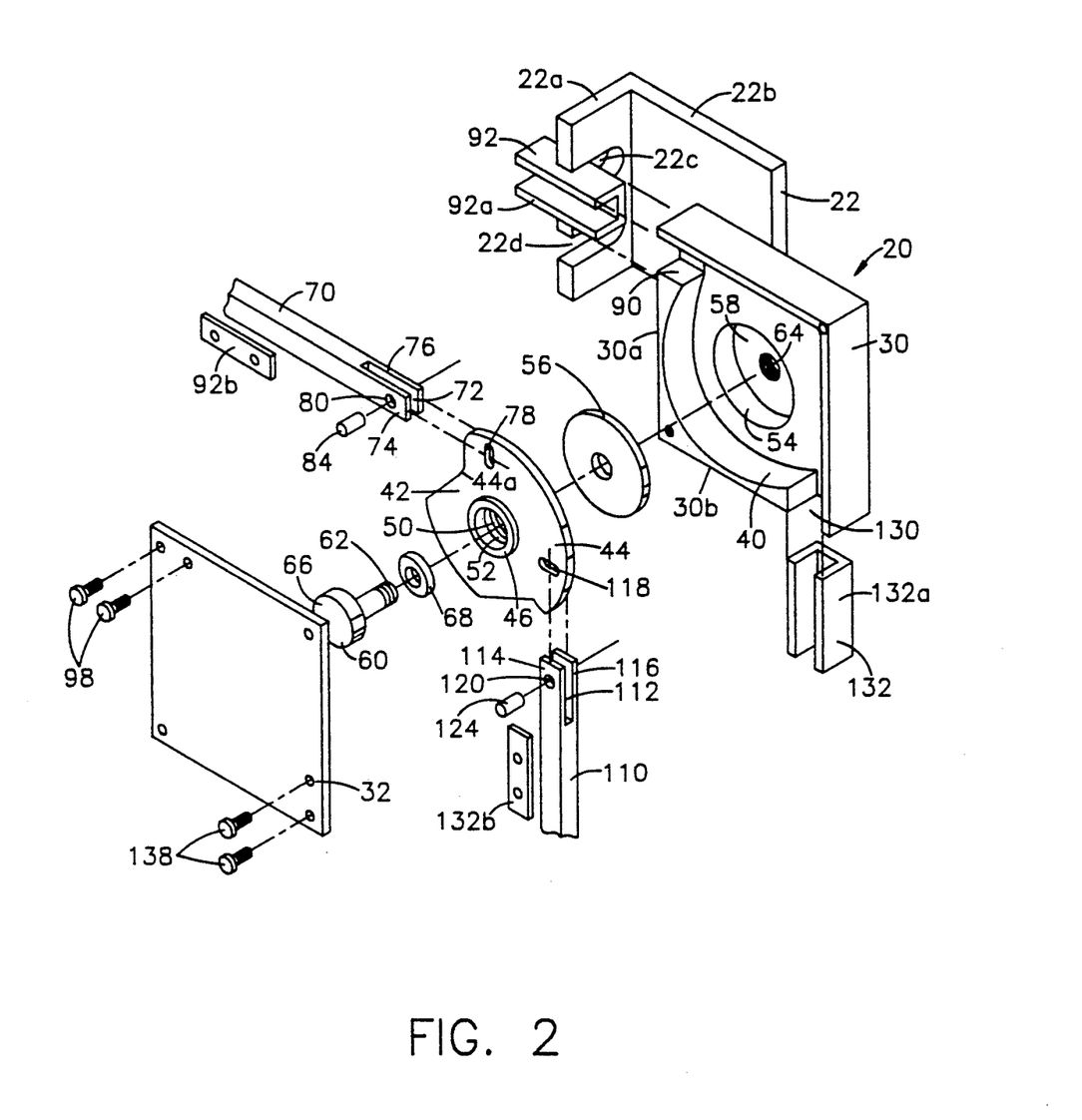
FIG. 2 is an exploded view of the saw apparatus of FIG. 1.

Apparatus 20 may be removably connected to saw 10 by a clamp member 22 having a first leg 22a and a second leg 22b connected perpendicularly thereto. Leg 22a includes a cut-out 22c for accommodating the operative connection of apparatus 20 to the saw bar 12 of saw 10 as leg 22a is inserted between the nose 14 and guide shoe 16 of the saw. A second cut-out 22d accommodates the bracket 18 for guide shoe 16 upon such connection. A pair of screws 34 inserted through slots 36 and 38 in clamp 22 secure the clamp to the housing 30 of apparatus 20. Consequently, apparatus 20 can be securely joined to saw 10 by sliding leg 22a toward housing 30 to tightly sandwich guide shoe 16 therebetween, whereupon screws 34 are tightened. The curved tip portion 16a of guide shoe 16 extends beyond the end of leg 22a, thereby insuring that the generally flat portion 16b of guide shoe 16 is held tightly. Apparatus 20 may also be provided with a guide shoe for supporting and guiding apparatus 20 during a cutting operation, such as guide shoe 24 which is connected to housing 30 by a pair of screws 26.

Figure 3:
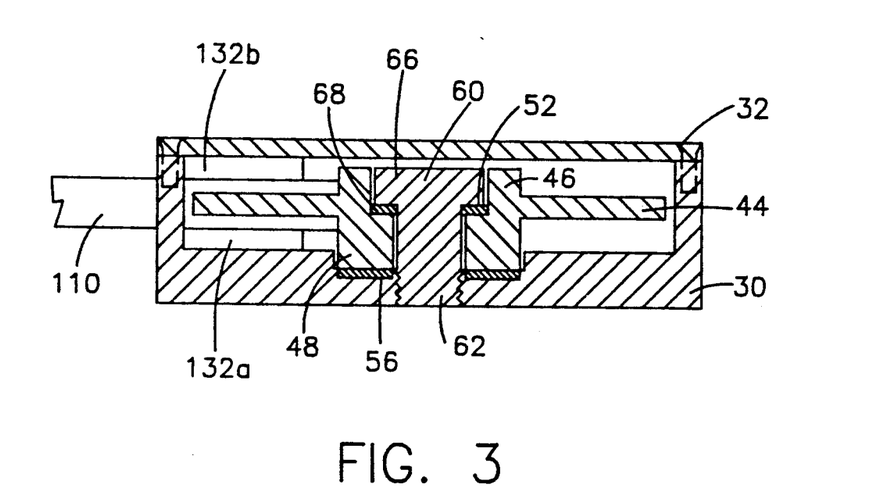
FIG. 3 is a sectional view taken along line 3—3 of FIG. 1.

Housing 30 defines a cavity 40 sized and shaped to receive a bell crank 42 for pivotal movement therein, a cover member 32 being adapted in assembled position to enclose cavity 40. As shown in FIGS. 2 and 3, bell crank 42 includes a generally planar member 44 with an annular hub 46 protruding from one side of planar member 44 and an annular hub 48 protruding from the other side of planar member 44, hubs 46 and 48 defining an aperture 50 extending through bell crank 42. The diameter of aperture 50 in hub 48 is smaller than its diameter in hub 46, thereby defining in aperture 50 a shoulder 52.

The cavity 40 in housing 30 is formed with a centrally disposed counterbore 54 having a diameter which is slightly larger than the diameter of hub 48. Bell crank 42 is assembled in housing 30 so that hub 48 is seated in counterbore 54, with a washer 56 interposed between the annular free end of hub 48 and the inner surface 58 of the counterbore. Washer 56 is typically formed from a wear-resistant material which will provide a low friction surface for the free end of hub 48 to bear against as bell crank 42 pivots in housing 30. Such materials may include, for example, polymeric materials such as nylon, Teflon, Delrin and the like, or non-polymeric materials conventionally used for this purpose, such as brass.

Bell crank 42 is held in assembled position in housing 30 by an attachment member 60 which is threaded at one end 62 for engagement with a threaded aperture 64 formed in surface 58. It will be appreciated that the threaded portion 62 of attachment member 60 need only extend a sufficient distance to engage threaded aperture 64, and need not extend to a position on attachment member 60 which will lie within aperture 50 of bell crank 42. The other end of attachment member 60 includes an enlarged head portion 66 which fits inside of hub 46 and engages shoulder 52. Another washer 68, substantially the same as washer 56, is interposed between shoulder 52 and the head portion 66 of attachment member 60 to provide a wear-resistant low friction layer between these members. Bell crank 42 is thus free to pivot about attachment member 60 while the attachment member holds the bell crank securely within cavity 40.

The saw bar 12 of saw 10 is operatively connected to bell crank 42 by a push rod 70. One end of push rod 70 includes an elongated slot 72 which defines fork members 74 and 76. Planar member 44 of bell crank 42 is received with a loose fit within slot 72 so that an elongated aperture 78 in planar member 44 is in alignment with apertures 80 (only one of which is shown) in fork members 74 and 76. The connection between bell crank 42 and push rod 70 is secured by a pin 84 which passes through elongated aperture 78 and is press fit in apertures 80. As will be appreciated from the discussion below regarding the operation of apparatus 20, slot 72 is sufficiently long that it can accommodate planar member 44 of bell crank 42 as push rod 70 moves into housing 30. Preferably, planar member 44 includes a cut-out portion 44a which enables push rod 70 to reciprocate the required amount without interference from planar member 44, and without having to make slot 72 in push rod 70 excessively long.

From its connection to bell crank 42 in cavity 40, push rod 70 extends through an opening 90 in side wall 30a of housing 30 for connection to saw bar 12. Preferably, opening 90 includes a bushing 92, formed from a material having a different hardness than push rod 70, to provide a non-binding surface for push rod 70 to bear against as it moves with respect to housing 30. Bushing 92 is held in assembled position in opening 90 by a pair of screws 94 which are preferably countersunk with respect to the surface of housing 30. In order to facilitate the assembly of apparatus 20, bushing 92 may be formed in two portions, a generally U-shaped portion 92a and a flat portion 92b. In such case, bushing portion 92a may be secured to housing 30 by countersunk screws 94, while bushing portion 92b may be secured in an appropriate location to cover member 32 by counter sunk screws 98.

Push rod 70 may be connected directly to saw bar 12 by conventional techniques, such as by forming the end of push rod 70 to resemble the end of a saw blade which is typically connected to the saw bar; alternatively, an adapter may be employed to facilitate the connection. One such adapter 102, shown in FIG. 1, may include a female portion 102a for receiving the free end of push rod 70, the adapter 102 being secured to push rod 70 by engaging screw 104 in a threaded aperture (not shown) in the push rod. The other end of adapter 102 may include a tongue portion 102b having one or more apertures 108 for connecting adapter 102 to saw bar 12 in a well-known fashion.

Another push rod 110 is connected to bell crank 42 at a different location on planar portion 44 than push rod 70. Push rod 110 is substantially the same as push rod 70. Thus, push rod 110 includes an elongated slot 112 defining fork members 114 and 116 at one end thereof. Planar member 44 of bell crank 42 is assembled with a loose fit within slot 112 so that an elongated aperture 118 in planar member 44 is aligned with apertures 120 (only one of which is shown) in fork members 114 and 116. A pin 124, assembled through elongated aperture 118 and press fit in apertures 120, secures push rod 110 to bell crank 42.

Push rod 110 extends from bell crank 42 in cavity 40 to the exterior of housing 30 through an opening 130 in side wall 30b of the housing. Opening 130 preferably includes a bushing 132 which is formed from substantially the same material as bushing 92, and which is held in assembled position in opening 130 by a pair of countersunk screws 134. Again, bushing 132 may be formed in two portions 132a and 132b, bushing portion 132a being secured to housing 30 by countersunk screws 134 and bushing portion 132b being secured to cover member 32 by countersunk screws 138.

Although a push rod 110 is illustrated in the figures as being disposed at a 90° angle to push rod 70, it will be appreciated that push rod 110 can be arranged to form any desirable angle with push rod 70. Obviously, for angles greater than 180°, the connection of apparatus 20 to saw 10 can be reversed so that saw blade 142 faces in the upward direction of FIG. 1. Moreover, in a further embodiment of the apparatus of the present invention described more fully hereinbelow, apparatus 20 can be constructed so that the angle between push rods 70 and 110 can be selected from among a number of predetermined angles.

At its other end, push rod 110 includes means for securing a saw blade 142 thereto. In a preferred arrangement, the free end of push rod 110 is provided with a U-shaped fastening member 144. The saw blade 142 is sandwiched between the fastening member 144 and the free end of push rod 110 so that a screw 148 can pass through aligned apertures (not shown) in the fastening member 144 and saw blade 142 for threaded engagement with an aperture (not shown) in push rod 110. Upon the tightening of screw 148, saw blade 142 is firmly held in place. Desirably, push rod 110 and the width of saw blade 142 fit snugly between the legs 144a and 144b of fastening member 144 so that saw blade 142 is held from pivoting with respect to the reciprocating direction of push rod 110.

Once apparatus 20 has been attached to saw 10, the reciprocating movement of saw bar 12 in the direction of arrow A shown in FIG. 1 which results from the actuation of saw 10 is converted by apparatus 20 to a corresponding reciprocating movement of saw blade 142 in the direction of arrow B. Thus, as saw bar 12 travels outwardly from the nose 14 of saw 10, that motion will be transmitted to push rod 70 by the direct connection of these elements to one another. Hence, push rod 70 will be forced inwardly into housing 30, thereby producing in bell crank 42 a moment which will cause bell crank 42 to rotate in a counterclockwise direction (referring to FIG. 1) about attachment member 60. This rotation of bell crank 42 will, in turn, force push rod 110 in a direction out from housing 30. Since push rods 70 and 110 are constricted to move in linear directions by bushings 92 and 132, respectively, these push rods will pivot with respect to bell crank 42 as the rotation of bell crank 42 proceeds.

As saw bar 12 reaches the end of its stroke and begins to move in an opposite direction into the nose 14 of saw 10, push rod 70 will reverse directions and begin to move outwardly from housing 30, thereby imparting to bell crank 42 a moment which will cause bell crank 42 to begin rotating in a clockwise direction (referring to FIG. 1) about attachment member 60. The clockwise rotation of bell crank 42 will, in turn, cause push rod 110 to also reverse direction and begin moving into housing 30. The reciprocating movement of saw bar 12 will thus cause the aforementioned movements of push rods 70 and 110 and bell crank 42 to be continuously repeated, whereupon a reciprocating motion will be imparted to saw blade 142 to effect cutting. It will be appreciated, of course, that by connecting push rod 110 to the lower portion of the periphery of bell crank 42, apparatus 20 can be arranged so that the movement of saw bar 12 in one direction results in a corresponding movement of push rod 110 in an opposite direction.

Figure 4:
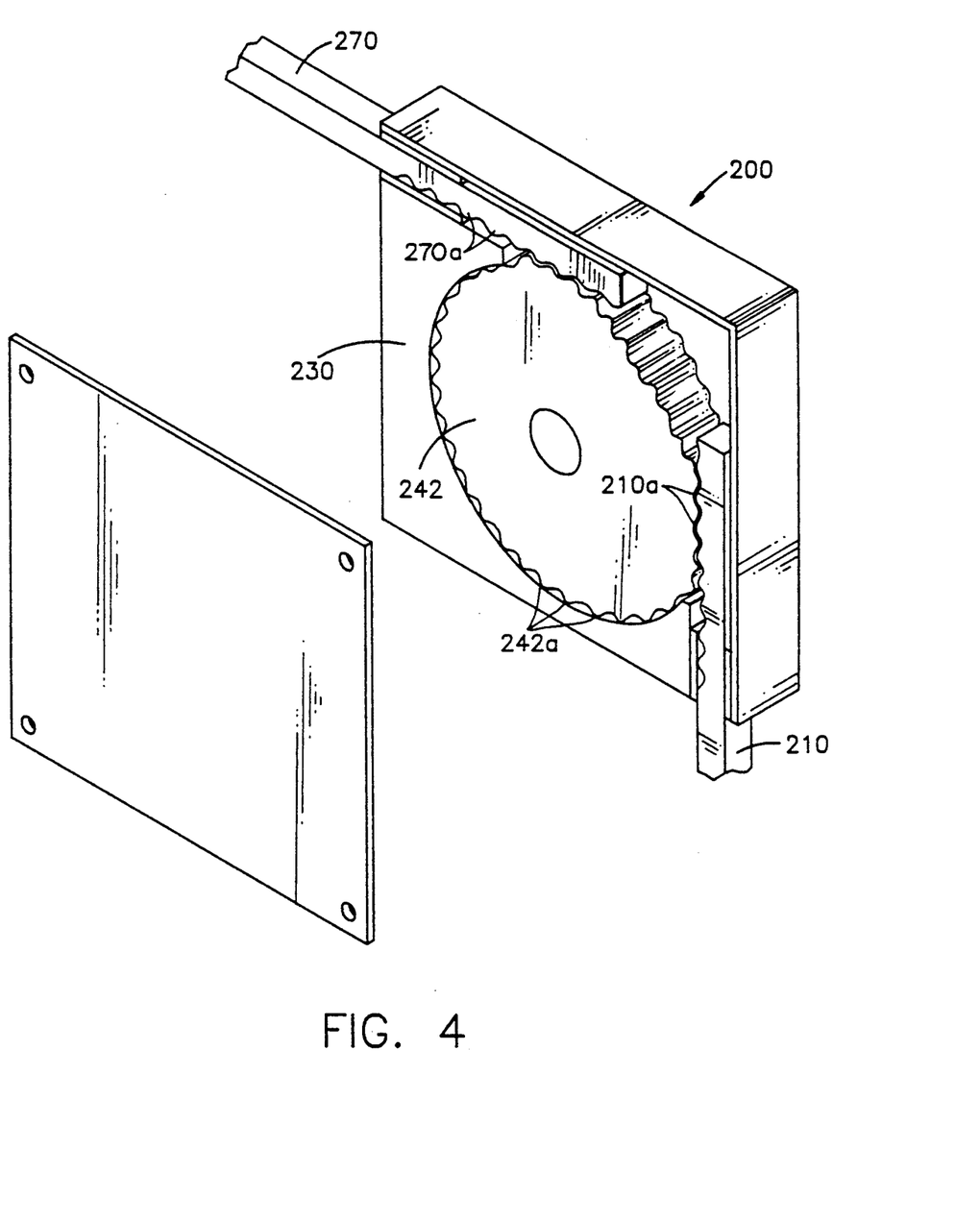
FIG. 4 is a perspective view of a second embodiment of the apparatus of the present invention with the cover removed to show the interior thereof.

An alternate embodiment of an apparatus 200 in accordance with the present invention is shown in FIG. 4. Apparatus 200 is similar to apparatus 20, except that the bell crank has been replaced with a gear 242 having a plurality of teeth 242a on the periphery thereof. These teeth 242a are adapted to matingly engage a plurality of teeth 210a and 270a formed along the end portion on one side of push rods 210 and 270. Hence, push rods 210 and 270 are not secured to gear 242.

Apparatus 200, which may be clamped to a reciprocating saw using the previously described clamp member 22, operates in substantially the same fashion as apparatus 20 described above in order to convert the reciprocating movement of a saw bar in the direction of arrow A (FIG. 1) to a corresponding reciprocating movement of a saw blade in the direction of arrow B. That is, the extension of the saw bar from the saw pivots gear 242 in a counterclockwise direction (referring to FIG. 1), thereby thrusting push rod 210 outwardly from housing 230. Similarly, the retraction of the saw bar into the saw causes a clockwise (again referring to FIG. 1) pivoting of gear 242 and a corresponding retraction of push rod 210 into housing 230.

Figure 5:
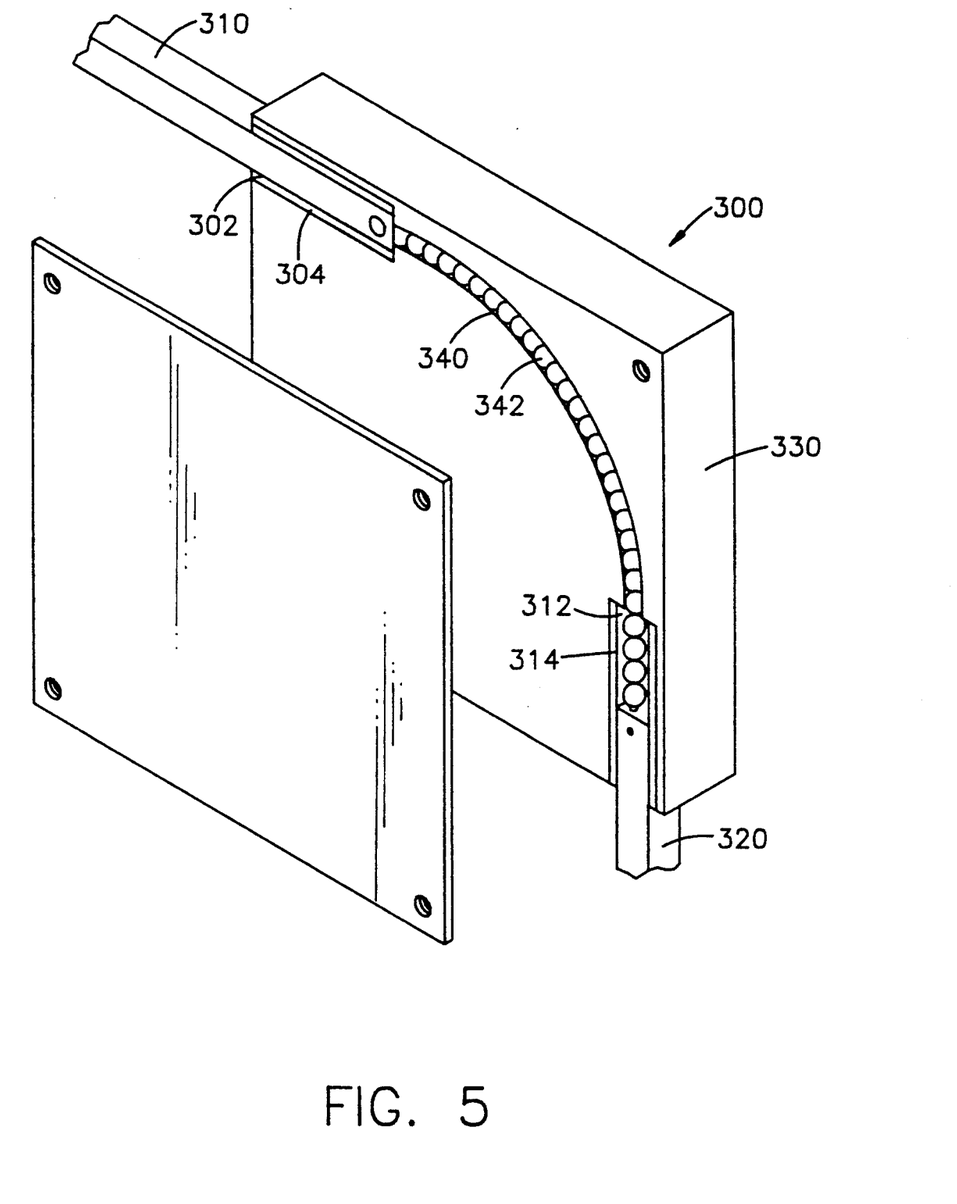
FIG. 5 is a perspective view of a third embodiment of the apparatus of the present invention with the cover removed to show the interior thereof.

FIG. 5 illustrates yet another embodiment of an apparatus 300 in accordance with the present invention. Apparatus 300 includes a housing 330 having a channel 302 extending inwardly from one side wall thereof and including a bushing 304 for receiving and guiding push rod 310 for reciprocating movement therein. Outside of housing 330, push rod 310 is connected to the saw bar of a reciprocating saw. A second channel 312 extends inwardly from another side wall of housing 330 and includes a bushing 314 for guiding the reciprocating movement of push rod 320 to which a saw blade may be connected. Push rods 310 and 320 are similar to push rods 70 and 110 described above in connection with apparatus 20, except that push rods 310 and 320 do not include elongated slots extending inwardly from their ends.

Push rods 310 and 320 are connected to one another by a flexible member 342 disposed in a guide channel 340 formed in an arcuate path in housing 330 between channels 302 and 312. Flexible member 342 may be formed from any material which has sufficient tensile and compressive strengths and sufficient rigidity that it can transmit the movements of push rod 310 to push rod 320 substantially without loss. Hence, although it is shown as a ball chain in FIG. 5, flexible member 342 may comprise other suitable materials, such as other types of flexible chains, steel cable, semi-rigid polymeric cables and the like.

Apparatus 300 is attached to a saw of the type having a reciprocation saw bar using a clamp (not shown) which is substantially the same as clamp member 22 described above. Upon actuation of the saw, the reciprocating movement of the saw bar in the direction of arrow A (FIG. 1) will be transmitted by push rod 310 and flexible member 342 to reciprocate push rod 320 and the saw blade connected thereto in the direction of arrow B. Thus, as the saw bar moves outwardly from the saw, this movement will be transmitted directly to push rod 310, forcing push rod 310 inwardly into housing 330. As a result, flexible member 342 will be pushed in guide channel 340 toward channel 312, thereby forcing push rod 320 outwardly from housing 330. At the end of its stroke, the saw bar will change directions and retract into the saw. Consequently, push rod 310 will be pulled out of housing 330, pulling with it flexible member 342 so that push rod 320 reverses direction and moves into housing 330. Thus, the reciprocating movement of the saw bar will be transmitted through push rods 310 and 320 and flexible member 342 to impart a reciprocating cutting movement to the saw blade.

Figure 6:
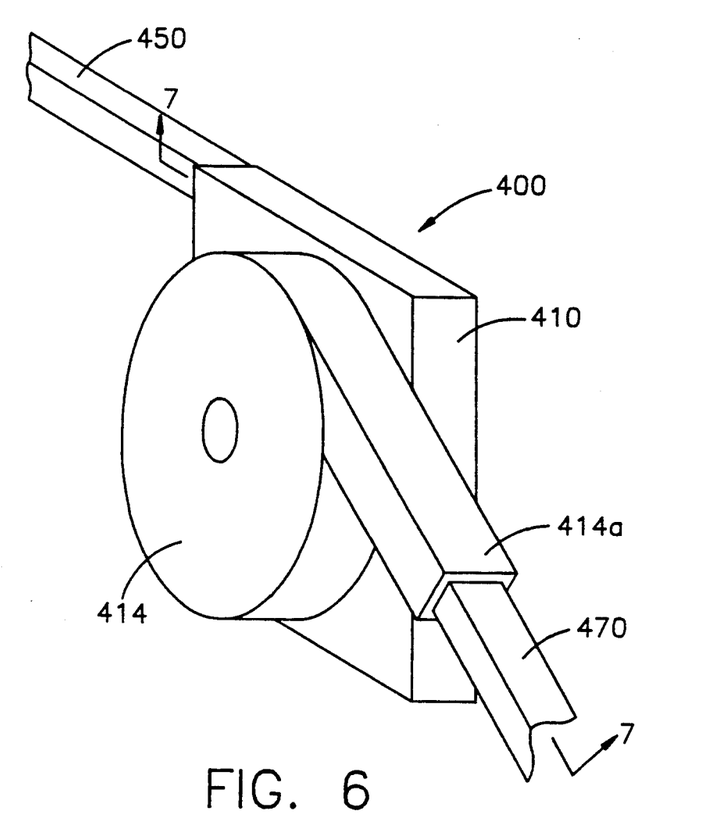
FIG. 6 is a perspective view of a fourth embodiment of the apparatus of the present invention.
Figure 7:
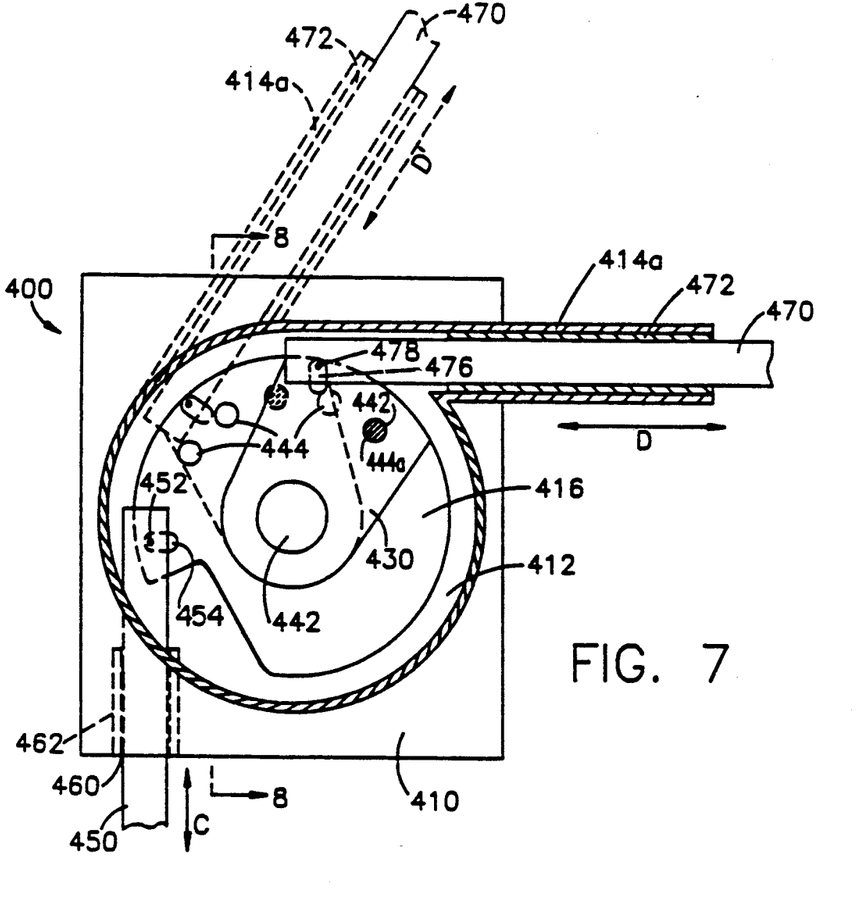
FIG. 7 is a plan view of the apparatus of FIG. 6, partly broken away to show the interior thereof.
Figure 8:
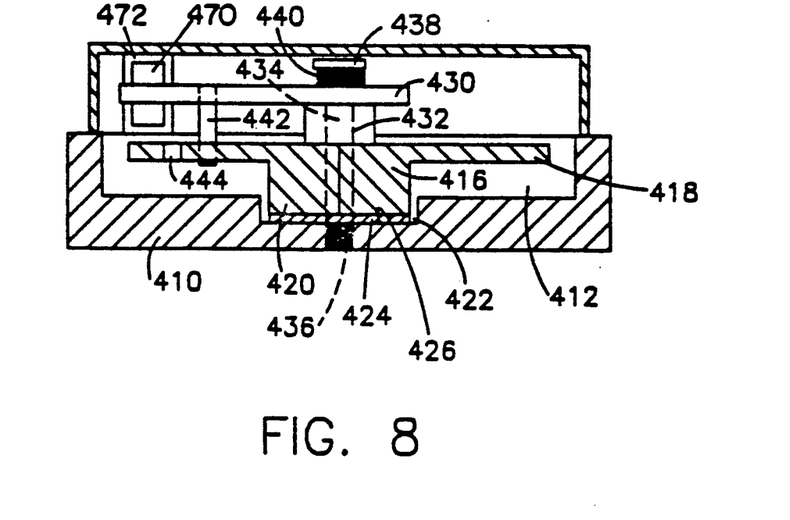
FIG. 8 is a sectional view taken along line 8—8 of FIG. 7.

In a still further embodiment, shown in FIGS. 6–8, an apparatus 400 in accordance with the present invention permits the angle between the reciprocating push rods to be adjusted to one of several preselected positions. Apparatus 400 includes a housing 410 defining a cavity 412 therein. A shroud 414 serves as a cover member for enclosing cavity 412. Cavity 412 is sized and shaped to accommodate a bell crank 416 assembled for pivotal movement in housing 410, bell crank 416 including a generally planar member 418 with an annular hub 420 formed on one side thereof. Bell crank 416 is assembled in housing 410 so that hub 420 is loosely seated in a counter bore 422 centrally disposed in cavity 412. A washer 424 interposed between the annular free end of hub 420 and the inner surface 426 of counter bore 422 reduces the friction and wear between these elements.

A planar connecting member 430 is assembled above bell crank 416 and held in spaced parallel relation to planar member 418 by a spacer 432. Bell crank 416, spacer 432, connecting member 430 and washer 424 are held in aligned and assembled relationship in housing 410 by a bolt 434 which extends through apertures (not shown) formed in each of these members and which includes a threaded end portion 436 which engages a threaded aperture formed in surface 426. A spring 440 compressed between connecting member 430 and the enlarged head portion 438 of bolt 434 provides a biasing force which holds connecting member 430, spacer 432 and bell crank 416 tightly against one another. Connecting member 430 is operatively connected for pivotal movement with bell crank 416 by a pin 442, one end of which is fixedly secured to connecting member 430, such as by press fit, threaded engagement, welding, etc., and the other end of which extends downwardly for selective engagement in one of a series of apertures 444 formed in the planar member 418 of bell crank 416.

A push rod 450 operatively connects the saw bar of a reciprocating saw (not shown) to bell crank 416. The planar member 418 of bell crank 416 is assembled with a loose fit within an elongated slot (not shown) provided at the end of push rod 450, the assembly being secured by a pin 452 which passes through an elongated aperture 454 formed in planar member 418 and which is fitted tightly through apertures (not shown) in push rod 450. As with the apparatus 20 described above, the elongated slot in push rod 450 is sufficiently long that it can accommodate planar member 418 of bell crank 416 through the entire range of motion of push rod 450.

From its connection to bell crank 416, push rod 450 extends through an opening 460 in a side wall of housing 410 and is connected to the saw bar of the reciprocating saw. Opening 460 preferably includes a bushing 462 which may be substantially the same as bushing 92 described above in connection with apparatus 20. Push rod 450 may be connected to the saw bar by an adapter, such as adapter 102 illustrated in FIG. 1, or by any well-known techniques.

A second push rod 470, substantially the same as push rod 450, is secured to connecting member 430. One end of push rod 470 includes an elongated slot (not shown) into which connecting member 430 is loosely fitted, the assembly being secured by a pin 478 which passes through an elongated aperture 476 formed in connected member 430 and which is press fit or otherwise connected through apertures (not shown) in push rod 470. From its assembly to connecting member 430, push rod 470 extends through an elongated stem 414a formed on shroud 414. Preferably, stem 414a includes a bushing 472 providing a non-binding surface for guiding push rod 470 as it moves with respect to stem 414a.

As noted above, the relative positions of push rods 450 and 470 can be adjusted to provide one of several available angles therebetween. Referring to FIG. 7, push rod 470 is shown in solid lines as forming a 90° angle with respect to push rod 450. To change this angle, shroud 414 is grasped and pulled away from housing 410. As stem 414a moves away from housing 410, push rod 470 will move with it, thereby exerting on connecting member 430 an upward force which will move the connecting member away from bell crank 416 against the biasing force of spring 440. When connecting member 430 has been moved away from planar member 418 of bell crank 416 a sufficient distance to free pin 442 from aperture 444a, connecting member 430 and the push rod 470 and shroud 414 operatively connected thereto will be free to rotate with respect to bell crank 416 and housing 410. Thus, shroud 414 can be rotated with respect to housing 410 and repositioned to achieve a desired angle between push rod 450 and 470. In one case, shroud 414, push rod 470 and connecting member 430 may be rotated to the position shown in phantom lines in FIG. 7. Once push rod 470 has been moved to this desired position, shroud 414 is released, whereupon the biasing force of spring 440 will push connecting member 430 toward planar member 418 so that pin 442 becomes inserted into a different one of apertures 444, locking connecting member 430 for pivoting movement with bell crank 416.

Apparatus 400 is attached to a saw having a reciprocating saw bar (not shown) in the same fashion as described above in connection with the other embodiments hereof so that push rod 450 is connected to the saw bar. In addition, a saw blade is connected to push rod 470 as described above. As the saw is operated, the movement of the saw bar out from the saw will be transmitted by push rod 450, thereby producing a moment in bell crank 416 which will cause the bell crank to rotate in the clockwise direction of FIG. 7 about bolt 434. Connecting member 430 is locked for movement with bell crank 416 through pin 442, and will therefore also rotate in the clockwise direction. This clockwise rotation of connecting member 430 will, in turn, force push rod 470 outwardly through stem 414a.

When the movement direction of the saw bar is reversed, push rod 450 will be pulled outwardly from housing 410, thereby imparting a moment to bell crank 416 which will cause the bell crank and connecting member 430 locked thereto to rotate in a counterclockwise direction about bolt 434. Consequently, push rod 470 will reverse directions and begin moving into housing 410. The reciprocating movement of the saw bar in the direction of arrow C (FIG. 7) will thus cause a corresponding reciprocating movement of push rods 450 and 470, bell crank 416 and connecting member 430 to impart a reciprocating, cutting motion to the saw blade in the direction of arrow D or D' (FIG. 7), or any other direction to which push rod 470 may be adjusted.

Figures 9, 9A:
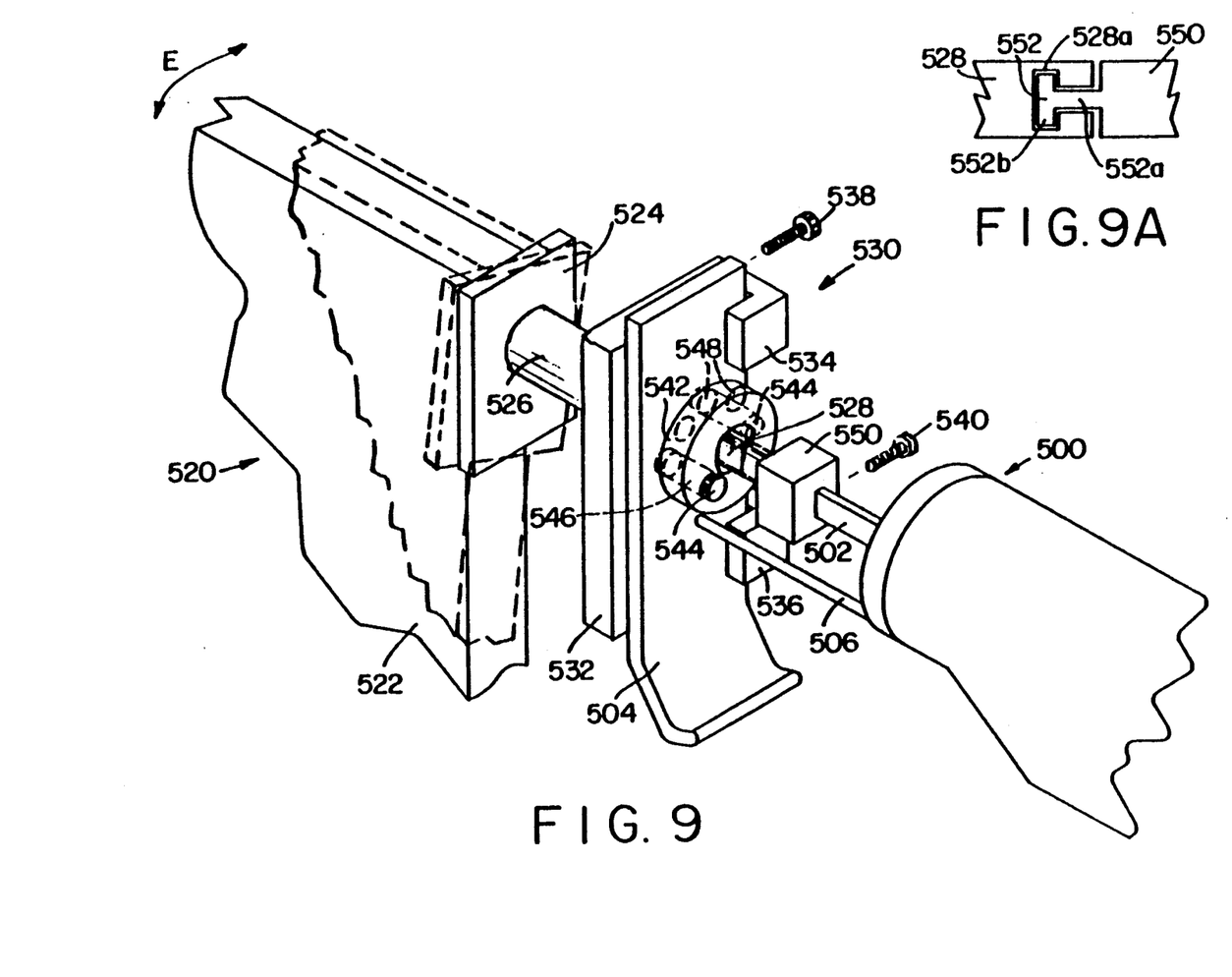
FIG. 9 is a highly schematic perspective view showing a pivotal attachment between the apparatus of the present invention and a reciprocating saw.
FIG. 9A is an enlarged detailed view showing a pivotal connection between a push rod and the saw bar of a reciprocating saw.

Optionally, the apparatus of the present invention, including any one of the embodiments described above, may be connected to a reciprocating saw so that it can be pivoted to different angular positions about the axis defined by the reciprocating direction of the saw bar. One arrangement for providing this pivotable connection between reciprocating saw 500 and an apparatus 520 in accordance with the present invention is shown in FIG. 9. In this arrangement, the housing 522 of apparatus 520 includes a connecting plate 524 connected to one edge thereof by any suitable means. A hollow, cylindrical member 526 is fixedly joined to connecting plate 524 in co-alignment with an opening (not shown) provided therein. As will be discussed more fully below, push rod 528 extends through the opening in connecting plate 524 and through cylindrical member 526 for connection to saw bar 502.

The guide shoe 504 of reciprocating saw 500, fixedly connected thereto by a bracket 506, is pivotably joined to cylindrical member 526 by a clamp assembly 530. Clamp assembly 530 includes a clamp plate 532 slidably mounted on cylindrical member 526, and a pair of L-shaped fastening members 534 and 536 which are slidably connected to clamp plate 532 by screws 538 and 540, respectively. Guide shoe 504 is connected in assembled relationship to clamp assembly 530 by squeezing guide shoe 504 between clamp plate 532 and fastening members 534 and 536, and then tightening screws 538 and 540. A collar 542, fastened to the end of cylindrical member 526 by threaded engagement, set screw engagement or any other well-known type of connection, secures the clamp assembly 530 and the guide shoe 504 associated therewith to cylindrical member 526 so that the clamp assembly and guide shoe are free to pivot with respect to the cylindrical member. The angular relationship between these members is fixed by a pin 544 which passes through an aperture 546 in collar 542 for select engagement with one of a plurality of apertures 548 in clamp plate 532. Thus, without pin 544 in place, apparatus 520, connecting plate 524, cylindrical member 526 and collar 542 are all free to pivot in the directions of arrow E with respect to clamp assembly 530, guide shoe 504 and saw 500. When apparatus 520 has been pivoted to a desired angular relationship with respect to the saw, such as the angular position shown in dashed lines in FIG. 9, this angular position can be fixed by inserting pin 544 through aperture 546 and then into an appropriate one of apertures 548.

In order for apparatus 520 to pivot with respect to saw 500, it is necessary to provide a pivotable connection between push rod 528 and saw bar 502. Such connection can be made by a multitude of well-known techniques. In one such technique depicted in FIG. 9, an adapter 550 is provided with a connecting member 552 at one end thereof. Connecting member 552 includes a cylindrical shaft portion 552a having an enlarged cylindrical head 552b formed on the end thereof.

Connecting member 552 is pivotably assembled in a T-shaped recess 528a formed in the end of push rod 528. This assembly will permit push rod 528 to pivot with respect to saw bar 502 as apparatus 520 is pivoted in the directions of arrow E with respect to saw 500, while at the same time maintaining the connection between these members so that push rod 528 reciprocates with saw bar 502.

Although the invention herein has been described with reference to particular embodiments, it is to be understood that these embodiments are merely illustrative of the principals and applications of the present invention. It is therefore to be understood that numerous modifications may be made to the illustrative embodiments and that other arrangements may be devised without departing from the spirit and scope of the present invention as set forth in the appended claims.

I claim:

1. An attachment for a power saw of a type having a reciprocating saw bar, comprising
   a housing,
   joining means for removably joining said housing to the saw,
   a first push rod disposed in said housing for reciprocating movement in a first linear direction,
   first connecting means for connecting said first push rod to said saw bar,
   a second push rod disposed in said housing for reciprocating movement in a second linear direction oriented at an angle to said first linear direction,
   second connecting means for connecting a saw blade to said push rod, and
   transmission means disposed between said first and second push rods for transmitting the reciprocating movement of said first push rod to a corresponding movement of said second push rod.

2. The attachment as claimed in claim 1, wherein said angle between said first and second linear directions is fixed.

3. The attachment as claimed in claim 2, wherein said angle between said first and second linear directions is 90°.

4. The attachment as claimed in claim 1, wherein said angle between said first and second linear directions is adjustable.

5. The attachment as claimed in claim 1, wherein said transmission means includes an intermediate member pivotably disposed in said housing, said first and second push rods being operatively connected to said intermediate member, whereby reciprocation of said first push rod in said first linear direction reciprocally pivots said intermediate member and caused said second push rod to reciprocate in said second linear direction.

6. The attachment as claimed in claim 5, wherein said angle between said first and second linear directions is fixed.

7. The attachment as claimed in claim 5, wherein said angle between said first and second linear directions is adjustable.

8. The attachment as claimed in claim 7, wherein said transmission means further includes an adjustable member pivotably disposed in said housing, said first push rod being connected to said intermediate member and said second push rod being connected to said adjustable member, said adjustable member being connectable at select positions to said intermediate member, each one of said select positions providing a different angle between said first and second linear directions.

9. The attachment as claimed in claim 5, wherein a circumferential portion of said intermediate member includes a first plurality of teeth and said first and second push rods each includes a second plurality of teeth, said second plurality of teeth adapted to matingly engage said first plurality of teeth.

10. The attachment as claimed in claim 1, wherein said transmission means includes a guide channel formed in said housing and a connecting member guided for reciprocating movement in said guide channel and having first and second ends, said first end being connected to said first push rod and said second end being connected to said second push rod.

11. The attachment as claimed in claim 1, wherein said joining means includes means for pivotably joining said housing to the saw, and wherein said first connecting means includes means for pivotably connecting said first push rod to said saw bar.

12. The attachment as claimed in claim 1, wherein said joining means includes clamp means for clamping said housing to a guide shoe on the saw.

13. The attachment as claimed in claim 12, wherein said clamp means includes means for pivotably clamping said housing to said guide shoe on the saw, and wherein said first connecting means includes means for pivotably connecting said first push rod to said saw bar.

14. A reciprocating saw assembly, comprising
   a saw housing, a saw bar and means for reciprocating said saw bar in a first linear direction with respect to said housing,
   an attachment housing,
   joining means for removably joining said attachment housing to said saw,
   a first push rod disposed in said attachment housing and connected to said saw bar for reciprocating movement in said first linear direction,
   a second push rod disposed in said attachment housing for reciprocating movement in a second linear direction oriented at an angle to said first linear direction,
   connecting means for connecting a saw blade to said second push rod, and
   transmission means disposed between said first and second push rods for transmitting the reciprocating movement of said first push rod to a corresponding reciprocating movement of said second push rod.

15. The assembly as claimed in claim 14, wherein said angle between said first and second linear directions is fixed.

16. The assembly as claimed in claim 15, wherein said angle between said first and second linear directions is 90°.

17. The assembly as claimed in claim 14, wherein said angle between said first and second linear directions is adjustable.

18. The assembly as claimed in claim 14, wherein said transmission means includes an intermediate member pivotably disposed in said attachment housing, said first and second push rods being operatively connected to said intermediate member, whereby reciprocation of said first push rod in said first linear direction reciprocally pivots said intermediate member and causes said second push rod to reciprocate in said second linear direction.

19. The assembly as claimed in claim 18, wherein said angle between said first and second linear directions is fixed.

20. The assembly as claimed in claim 18, wherein said angle between said first and second linear directions is adjustable.

21. The assembly as claimed in claim 20, wherein said transmission means further includes an adjustable member pivotably disposed in said attachment housing, said first push rod being connected to said intermediate member and said second push rod being connected to said adjustable member, said adjustable member being connectable at select positions to said intermediate member, each one of said select positions providing a different angle between said first and second linear directions.

22. The assembly as claimed in claim 18, wherein a circumferential portion of said intermediate member includes a first plurality of teeth and said first and second push rods each includes a second plurality of teeth, said second plurality of teeth adapted to matingly engage said first plurality of teeth.

23. The assembly as claimed in claim 14, wherein said transmission means includes a guide channel formed in said attachment housing and a connecting member guided for reciprocating movement in said guide channel and having first and second ends, said first end being connected to said first push rod and said second end being connected to said second push rod.

24. The assembly as claimed in claim 14, wherein said joining means includes means for pivotably joining said attachment housing to said saw housing, and wherein said first push rod is connected to said saw bar for pivotable movement with respect to said saw bar.

25. The assembly as claimed in claim 14, wherein said saw includes a guide shoe and said joining means includes clamp means for clamping said attachment housing to said guide shoe.

26. The assembly as claimed in claim 25, wherein said clamp means includes means for pivotably clamping said attachment housing to said guide shoe, and wherein said first push rod is connected to said saw bar for pivotable movement with respect to said saw bar.

27. A reciprocating saw, comprising
a saw housing,
a saw bar disposed in said saw housing,
means for reciprocating said saw bar in a first linear direction with respect to said saw housing,
a blade carrier movably mounted with respect to said saw housing for reciprocating movement in a second linear direction oriented at an angle to said first linear direction,
connecting means for connecting a saw blade to said blade carrier, and
transmitting means connected between said saw bar and said blade carrier for transmitting the reciprocating movement of said saw bar to a corresponding reciprocating movement of said blade carrier.

* * * * *

UNITED STATES PATENT AND TRADEMARK OFFICE
CERTIFICATE OF CORRECTION

PATENT NO. : 5,193,281
DATED : March 16, 1993
INVENTOR(S) : Kasten

It is certified that error appears in the above-indentified patent and that said Letters Patent is hereby corrected as shown below:

```
Column 11, line 36, "movement" should read
--reciprocating movement--.
```

Signed and Sealed this

Sixteenth Day of November, 1993

*Attest:*

BRUCE LEHMAN

*Attesting Officer*     Commissioner of Patents and Trademarks